United States Patent [19]

Burke et al.

[11] Patent Number: 5,535,394
[45] Date of Patent: Jul. 9, 1996

[54] METHODS FOR DISTINGUISHING DYNAMICALLY ALLOCATED STORAGE ALONG DIFFERENT CALL PATHS AND FOR PROVIDING A COMPACT REPRESENTATION OF ALIAS ANALYSIS

[75] Inventors: Michael G. Burke, Yonkers, N.Y.; Paul R. Carini, Sherman, Conn.; Jong-Deok Choi, Mount Kisco, N.Y.

[73] Assignee: International Business Machines Corporation, Armonk, N.Y.

[21] Appl. No.: 540,420

[22] Filed: Oct. 10, 1995

Related U.S. Application Data

[63] Continuation of Ser. No. 139,484, Oct. 20, 1993, abandoned.

[51] Int. Cl.$^6$ ........................................................ G06F 9/44
[52] U.S. Cl. .................................... 395/700; 364/DIG. 1; 364/232.23; 364/280.5
[58] Field of Search ............................................... 395/700

[56] References Cited

U.S. PATENT DOCUMENTS

| | | |
|---|---|---|
| 4,503,492 | 3/1985 | Pilat . |
| 4,893,234 | 1/1990 | Davidson et al. . |
| 4,922,414 | 5/1990 | Holloway et al. . |
| 5,107,418 | 4/1992 | Cramer et al. . |
| 5,161,216 | 11/1992 | Reps et al. ................................ 395/375 |
| 5,170,465 | 12/1992 | McKeeman et al. . |
| 5,175,856 | 12/1992 | Van Dyke et al. . |
| 5,182,806 | 1/1993 | McKeeman et al. . |
| 5,428,793 | 6/1995 | Odnert et al. ............................ 395/700 |

OTHER PUBLICATIONS

Burke, Michael & Ryder, Barbara G., "A Critical Analysis of Incremental Data Flow Analysis Algorithms", IEEE Jul. 1990.
Marlowe, Thomas J. & Ryder, Barbara G., "Hybrid Incremental Alias Analysis", 1991 IEEE.
Banning, J., Sixth Annual ACM Symposium on Principles of Programming Languages, (Jan. 1979) pp. 29–41.
Cooper et al., SIGPLAN '88 Conference on Programming Language Design and Implementation (Jun. 1988) pp. 57–66.
Callahan, D., Proceedings of the SIGPLAN '88 Conference on Programming Language Design and Implementation, (Jun. 1988) pp. 47–56.
Landi & Ryder, Eighteenth Annual ACM Symposium on Principles of Programming Languages, "The Interprocedural Control Flow Graph" Jan. 1991 pp. 93–103.
Harold and Soffa, Proceedings of the IEEE Computer Society 1990 International Conference on Computer Languages, (1990) pp. 297–306.
Landi & Ryder, SIGPLAN '92 Conference on Programming Language Design and Implementation pp. 235–248. (Jun. 1992).
J. Ferrante, K., Ottenstein "The Program Dependence Graph and Its Use In Optimization" IBM Technical Report RC–10543 Jun. 1984 Computer Science pp. 1–33.
L. Gurevich, Harel & Rubin, "Computing the Aliasing Relation" IBM TDB Jan. 1986 pp. 3503–3508.
K. Gilbert, "Effective Register Management During Code Generation" Jan. 1973 IBM TDB pp. 2640–2645.
ACM SIGPLAN '92 Conference on Programming Language Design and Implementation, San Francisco, Ca. vol. 27 No. 7 Jul. 1992 (Abstract).

(List continued on next page.)

*Primary Examiner*—Kevin A. Kriess
*Attorney, Agent, or Firm*—Louis J. Percello

[57] ABSTRACT

The invention provides a method for improving the precision of interprocedural alias analysis by efficiently qualifying (naming) dynamically allocated storage locations with call path information and identifying as identical qualified name pairs, one of which is a prefix substring of another. The invention also provides a compact method for representing alias information which improves the efficiency and in some cases, the precision, of alias analysis, by eliminating alias relations that involve more than one level of dereferencing and by eliminating all alias relations that do not contain at least one dereferenced object.

4 Claims, 8 Drawing Sheets

OTHER PUBLICATIONS

L. J. Hendren, J. Hummel, A. Nicolau "Abstractions for Recursive Pointer Data Strufutures:Improving the Analysis and Transformation of Imperative Programs" SIGPLAN Not. USA vol. 27, No. 7, pp. 249–260 Jul. 1992 (Abstract).

J. Crowcroft, I. Wakeman, Z. Wang, D. Sirovica, "Is Layering, Harmful?" (Remote Procedure Call) IEEE Netw. (USA) vol. 6, No. 1, Jan. 1992 pp. 20–24 (Abstract).

Yi–Hsiu Wei, A. Stoyenko, G. Goldszmidt "The Design of a Stub Generator for Heterogeneous RPC Systems" J. Parallel Distrib. Comput. USA, vol. 11, No. 3, pp. 188–197 Mar. 1991 (Abstract).

A. Ah–kee "Proof Obligations for Blocks and Procedures" Form. Asp. Comput. UK, vol. 2, No. 4, pp. 312–330, Oct.–Dec. 1990 (Abstract).

E. G. Wagner et al., "On Declarations" Categorical Methods in Computer Science With Aspects from Topology, Springer–Verlag, Vi+350pp. p. 261–7, 1989 (Abstract).

D. R. Chase, M. Wegman, F. Zadeck, "Analysis of Pointers and Structures" SIGPLAN Not. (USA), vol. 25, No. 6, pp. 296–310, Jun. 1990 (Abstract).

L. Beliard, "Microsoft C 6.0:The New–Generation C" Micro Syst. (France) No. 109, pp. 105–111 Jun. 1990 (Journal Paper) (Abstract).

S. Richardson, M. Ganapathi "Code Optimization Across Procedures" Computer (USA), vol. 22, No. 2, pp. 42–50, Feb. 1989 (Abstract).

H. Dietz, C–H Chi, "CRegs: A New Kind of memory for Referencing Arrays and Pointers" Proceedings. Supercomputing '88 IEEE Comput. Soc. Press, Xii+458pp.360–7. (Abstract).

M. L. Scott et al., "Design Rationale for Psyche, A General Purpose Multiprocessor Operating System" Proceedings International Conf. on Parallel Processing Pen State U. (xii+461+462x+262xiii+311) pp. 255–262 vol. 2, 1988 (Abstract).

V. A. Guarna, F. Briggs, Conference Paper Proceedings 1988 International Conference on Parallel processing (xiii+461+x+262+xiii+311) pp. 212–220 vol. 2, 1988 (Abstract).

J. R. Larus, P. Hilfinger, "Detecting Conflicts Between Structure Accesses" SIGPLAN Not. (USA) vol. 23, No. 7, pp. 21–34, Jul. 1988 (Abstract).

J. P. Jacky, I. J. Kalet, "An Object–Oriented Programming Discipline or Standard Pascal" Commun. ACM (USA), vol. 30. No. 9, pp. 772–6, Sep. 1987 (Abstract).

R. B. Essick, IV, "Cross–Architecture Procedure Call", RPT. No. UIUCDCS–R–87–1340, v+144pp. May 1987 (Abstract).

D. A. Price, P. C. Poole, "Dynamic Data Flow Analysis–A Tool for Reliability" Instn. Eng. Australia, Barton, ACT, Aust. pp. 97–100, Feb. 1986 (Abstract).

M. Burke, R. Cytron "Inerprocedural Dependence Analysis and Parallelization" Dept. of Comput. Sci., IBM TJW Res. Center, Yorktown vol. 21, No. 7, pp. 162–175 Jul. 1986 Conference paper (Abstract).

K. D. Cooper, K. Kennedy, "Efficient Computation of Flow Insensitive Interprocedural Summary Information" SIGPLAN 84' vol. 19, No. 6, pp. 247–258, Jun. 1984 (Abstract).

S. Walters, "The Advanced Architecture of the Z8 Microcomputer" Electron. Conventions, El Segundo, CA, USApp.26–3/1–12, 1981 Conf. Paper (Abstract).

A. L. Chow, A. Rudmik "The Design of a Data Flow Analyzer" SIGPLAN 82' vol. 17, no. 6, pp. 106–113, Jun. 1982 Conf. Paper (Abstract).

G. Barth, "Aliasing in Interprocedural Data flow Analysis" Fachbereich Informatik, Germany, No. 43, pp. 275–286, 1981 (Abstract).

R. Cartwright, D. Oppen, "The Logic of Aliasing" Journal Paper Acta Inf. (Germany), vol. 15, No. 4, pp. 365–384, Aug. 1981 (Abstract).

D. HJ. Uyeno, w. Vaessen, "PASSIM:a discrete–Event Simulation Package for PASCAL Simulation" Journal Paper Simulation (USA), vol. 35, No. 6, pp. 183–190, Dec. 1980 (Abstract).

F. T. Bradshaw et al., "Procedure Semantics and Language Definition" SIGPLAN Not. (USA), vol. 15, No. 6, pp. 28–33, Jun. 1980 (Abstract).

R. L. Schwartz, "Aliasing Among pointers in EUCLID" Inf. Process. Lett. (Netherlands), vol. 9, No. 2, pp. 76–79, Aug. 1979 Jour. Paper (Abstract).

D. B. Lomet, "Data Flow Analysis in the Presence of Procedure Calls" IBM Research & Dev. USA, vol. 21, No. 6, pp. 559–571, Nov. 1977 (Abstract).

T. Yamamoto "A Scan Conversion Algorithm Using Quad–Tree Representation of dZ Buffer" Syst. Comput. Jpn. USA, vol. 23, No. 8, pp. 65–74 1992 (Abstract).

A. W. Appel, Zhong Shao, "Callee–save Registers in Continuation–passing Style" LISP Symb. Comput. (Netherlands) vol. 5, No. 3, pp. 191–221 Sep. 1992 (Abstract).

P. Emma, J. Pomerene "Conditional Execution in a Registr Management Scheme for Out of Sequence Execution" IBM TDB n10A Mar. 1992 pp. 449–454.

```
int *p, *q, *r, *s, *t;

main(){
  p = SUB1();
  q = SUB2();
};/*main*/ int* SUB1(){
  r = SUB3();
  SUB4();
  return(r);
};/*SUB1*/ int* SUB2(){
  s = SUB3();
  SUB4();
  return(s);
};/*SUB2*/ int* SUB3(){
  t = malloc(....);
  SUB4();
  return(t);
};/*SUB3*/
```

METHODS FOR DISTINGUISHING DYNAMICALLY ALLOCATED STORAGE ALONG DIFFERENT CALL PATHS AND FOR PROVIDING A COMPACT REPRESENTATION OF ALIAS ANALYSIS

This is a continuation of application Ser. No. 08/139,484, filed Oct. 20, 1993 now abandoned.

FIELD OF THE INVENTION

The present invention relates generally to a system and method of efficiently handling compiler optimization problems, and more particularly to a system and method for analyzing programs containing pointers and dynamically allocated storage.

BACKGROUND OF THE INVENTION

Figure 1:
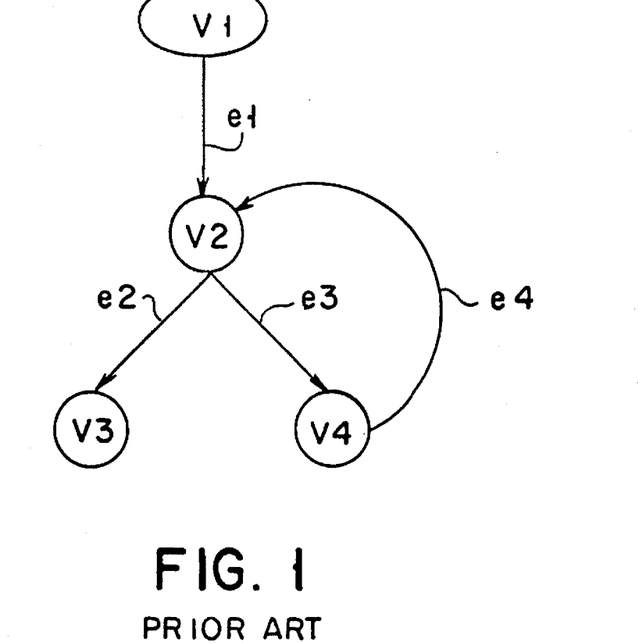
FIG. 1 shows a prior art example of a flow graph.
Figure 2:
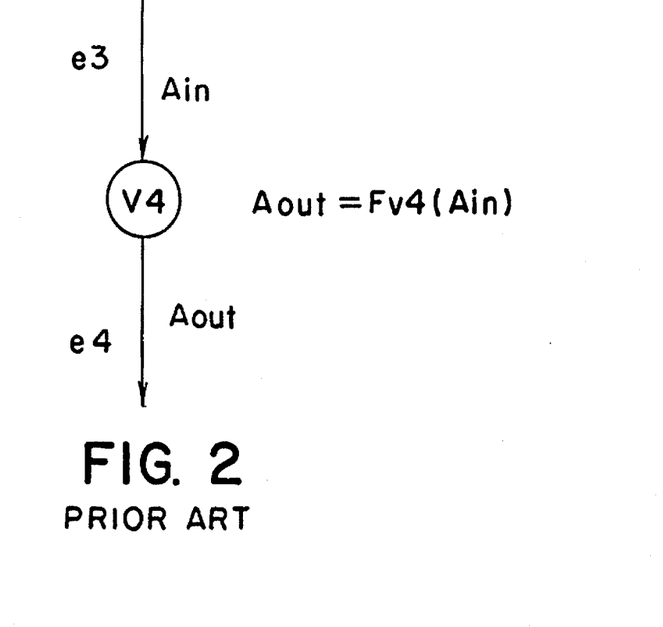
FIG. 2 shows a prior art example of a transfer function.

Optimizing and parallelizing compilers perform data flow analysis to insure the correctness of their program transformations. Software development environments also utilize data flow analysis. The input to data flow analysis is a data flow framework as described in Marlowe, T. J., *Data Flow Analysis and Incremental Iteration,* Rutgers University (October 1989). The data flow framework includes a flow graph and a formal basis for describing the behavior and interaction of flow graph nodes (FIG. 1). The behavior of each node is formalized by its transfer function (FIG. 2), which describes how a node affects the solution as a function of the behavior of other nodes. When considered as a whole, the node transfer functions present a set of simultaneous equations, whose maximum fixed point (MFP) global evaluation provides the best computable solution at all edges or nodes of the flow graph. In other words, all other correct solutions are either uncomputable or not as precise.

A data flow framework D is defined in terms of three components. That is, D=<FG,L,F>, where a flow graph FG=(F,E,r) is a finite set V of nodes that includes a distinguished start node r (shown as node V1 in FIG. 1), and a finite set E of edges (shown as e1, e2, e3, and e4 in FIG. 1). An edge is an ordered pair (v,w) of nodes; v is the source of the edge and w its target. For example, in FIG. 1, V1, V2, V3, and V4 are nodes with V1 being the start node r. The set of edges, E, comprise e1, e2, e3. and e4. The source of e2 is V2 and its target is V3. The edges are designated by their respective ordered pair of source and target nodes, i.e., (v,w), therefore, e1=(V1, V2); e2=(V2, V3); e3=(V2, V4); and e4=(V4, V2). Where the edge (v,w) is in E, we say that v is a predecessor of w and w a successor of v. For example, in FIG. 1, V2 is a predecessor of V3 and of V4, and also a successor of V4. A sequence of edges $(v_1,v_2),(v_2,v_3), \ldots ,(v_{n-1},v_n)$ in FG is a path from $v_1$ to $v_n$. For example, in FIG. 1, e1, e2 is a path from V1 to V3 and e3, e4, e2 is a path from V2 to V3. If there is a path from $v_i$ to $v_j$, we say that $v_i$ reaches $v_j$ or that $v_j$ is reachable from $v_i$. Every node in FG is reachable from r, and r is not the target node or any edge in E. A cycle is a path for which $v_1=v_n$. For example, in FIG. 1, the path e3,e4 forms a cycle.

A "meet semilattice" is a set of elements and a partial ordering of those elements which is defined by a "meet" ($\cap$) operator. More specifically, the meet semilattice L=<A,TOP, BOTTOM,<, $\cap$>, where A is a set whose elements form the domain of the data flow problem (i.e., the inputs and outputs associated with the flow graph nodes), TOP and BOTTOM are distinguished elements of A (symbolizing the best and the worst possible solution to the optimization problem, respectively,)< is a reflexive partial order, and $\cap$ is the associative and commutative "meet" operator, such that for any a,b in A, $a<b \Leftrightarrow a \cap b = a$ $a \cap a = a$ $a \cap b < a$ $a \cap \text{TOP} = a$ $a \cap \text{BOTTOM} = \text{BOTTOM}$ Where the elements of the domain are sets, examples of meet operators are intersection and union. Where the operator is union, TOP would typically be the empty set and BOTTOM the universal set. Where the operator is intersection, TOP would typically be the universal set and BOTTOM the empty set. Intuitively, higher points in the lattice correspond to higher degrees of information.

The input and output to a node Y are elements of A. A transfer function (FIG. 2) operates on the input to a node Y to determine the output of the node Y. More specifically, F is a set of transfer functions such that F is a subset of $\{f:A \rightarrow A\}$. That is, any function in F has A as its domain and its range. This set includes the identity function i (which, applied to the input of a node, produces output identical to the input), and the set is closed under composition and meet. The data flow effect of node Y is described by its transfer function $f_Y$ in F. The local properties of Y are captured by its transfer function: $\text{OUT}_Y = f_Y(\text{IN}_Y)$, where $\text{IN}_Y$ and $\text{OUT}_Y$ are in A. After a framework has been globally evaluated, each node Y has a solution $\text{OUT}_Y$ that is consistent with transfer functions at every node. In general, the best computable solution for a data flow framework is the maximum fixed convergence of the equations:

$$\text{OUT}_{root} = \text{TOP}$$

$$\text{IN}_Y = \cap (\forall X \text{ in Preds}(Y)) \text{OUT}_X$$

$$\text{OUT}_Y = f_Y(\text{IN}_Y)$$

where Preds(Y) is the set of predecessors of node Y. The solution to the above equations is called the Maximum Fixed Point (MFP) solution. During an evaluation, iterations over the flow graph nodes take place until all node outputs remain unchanged. During such evaluation, $\text{IN}_Y$ travels down the lattice from TOP to the element that represents the best computable solution prior to Y, regardless of the flow path taken.

In a forward data flow problem, for each node Y, $\text{IN}_Y$ is defined in terms of the predecessors of Y (as in the equations above). In a backward data flow problem, for each node Y, $\text{IN}_Y$ is defined in terms of the successors of Y. A data flow problem which is either forward or backward is unidirectional. A data flow problem for which $\text{IN}_Y$ for each node Y depends on both the predecessors and successors of Y is bidirectional.

The prior art describes a program in terms of a general program model that is also used by this disclosure. This program model consists of a set of one or more external procedures, where an external procedure is one that is not contained (declared) within another procedure but may contain internal procedures nested within it. One of the external procedures is the main procedure. Recursion is allowed: A procedure may directly or indirectly invoke itself.

The containment relationships among the procedures in a program P may be represented as a forest of trees $F_P$, where the nodes of the trees represent procedures/routines. For each external procedure/routine, there is a tree in $F_P$ whose root node represents the external procedure/routine. The variables declared directly within a procedure/routine are local to the procedure/routine, while the variables declared in the ancestors of a procedure/routine in $F_p$ are global to it. The set of variables global to procedure P is denoted GLOBAL(P). Among the local variables of a procedure P are zero or more formal parameters. The set of such variables in P is denoted FORMAL(P). A variable that is either local or global with respect to a procedure P is known to P. An external variable is one that is global to all the procedures of a program. The local variables of a procedure are visible to it; its global variables that are not hidden from it are also visible. The specific mechanism for hiding is irrelevant to our method. One mechanism provided for hiding a global variable is the declaration of a local variable of the same name in an internal procedure.

The prior art includes a model for procedural interaction which is also used in this disclosure. In the model, a statement in a program that invokes a procedure is referred to as a call site. It designates a called procedure, which must be visible to the procedure containing the call site (the calling procedure). For each formal parameter of the called procedure, the call site must designate an argument that is associated with it. An argument may be a reference argument, which is a variable that is visible to the calling procedure and is passed-by-reference to its corresponding formal parameter. When the call site is invoked, a formal parameter that is associated with a reference argument assumes the same address in memory as the argument. Procedures interact at call sites through reference arguments and also through variables that are global to the called procedure. Thus a call site s is said to pass a variable X to a variable Y if and only if variable Y is the same variable as X and is global to the called procedure, or X is passed-by-reference to Y.

Figure 3:
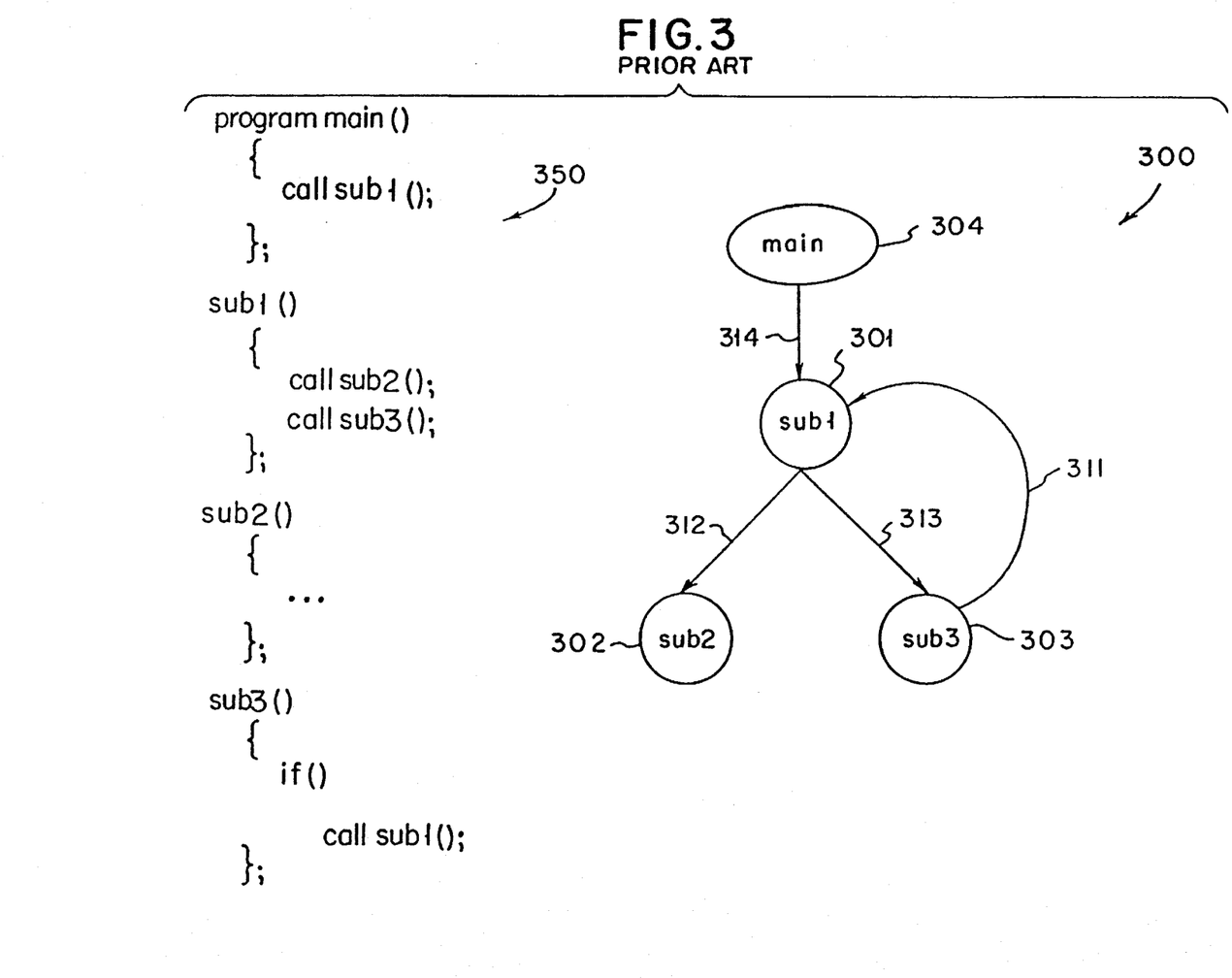
FIG. 3 shows a prior art example of a program call graph.

See FIG. 3. The interprocedural structure of a program 350 is represented by a Program Call Graph (PCG) 300, a flow graph for which each procedure is uniquely represented by a single node (301–304) and each call site by a unique edge (311–314). The start node 304 represents the main procedure. The node representing a given procedure/routine P shall be referred to as node P. The edge (P,Q) represents a call site in P that invokes Q. By the definition of a flow graph, it is assumed that every node in the call graph is reachable from the main procedure 304.

The data flow analysis of a procedure is interprocedural if it is performed across procedure boundaries. Interprocedural data flow analysis algorithms have been developed for various interprocedural problems.

Aliases occur when two or more access paths refer to the same storage location. An access path is an l-value expression which is constructed from variables, pointer indirection operators, and field select operators. Static aliases occur due to the FORTRAN EQUIVALENCE or C union construct and are constant for the duration of the program execution. Static alias information is typically determined during the semantic phase of compilation, and is not further considered here. Dynamic aliases arise during program execution. Program constructs such as the FORTRAN reference parameter mechanism and pointers induce dynamic aliasing. Two access paths are may-aliases at a point p in a program if they refer to the same storage location in some execution instances of p. This section describes the determination of may-aliases. May-aliases are referred to as aliases, whenever the meaning is clear from context.

A dynamically allocated storage location is frequently referred to as an anonymous object. The term named object is used to refer to a memory location associated with a name. The naming of memory locations (including those that are dynamically allocated) is required for the correctness of data flow analysis. A pointer expression is always associated with at least one named object to which it is aliased. The named object, instead of the access path itself, is used for data flow analysis.

Alias information can be regarded as exhaustive when it contains all explicit alias relations holding at each statement. However, exhaustive alias information holding at each statement is rarely needed. In most cases for a statement, alias relations of only those access paths referenced at that statement are needed, and having exhaustive information for all the access paths at each statement incurs unnecessary time and space cost.

Pointer-induced alias relations determine a directed graph. Each named object corresponds to a unique node in the directed graph. An alias<*p,a> implies that there is a (de-referencing) edge from node p to node a. Likewise, <**q,b> implies that there exists an object c such that there is an edge from q to c and one from c to b.

STATEMENT OF PROBLEMS WITH THE PRIOR ART

A scheme used in the prior art to name dynamically allocated objects (Chase et al, *Proceedings of the ACM SIGPLAN '90 Conference on Programming Language Design and Implementation*, 296–310 (June 1990)) is based on the statement in the program where the dynamically allocated object is created. A drawback of this naming scheme is that different instances of anonymous objects created at the same malloc statement but along different paths in the PCG become indistinguishable.

Figure 8:
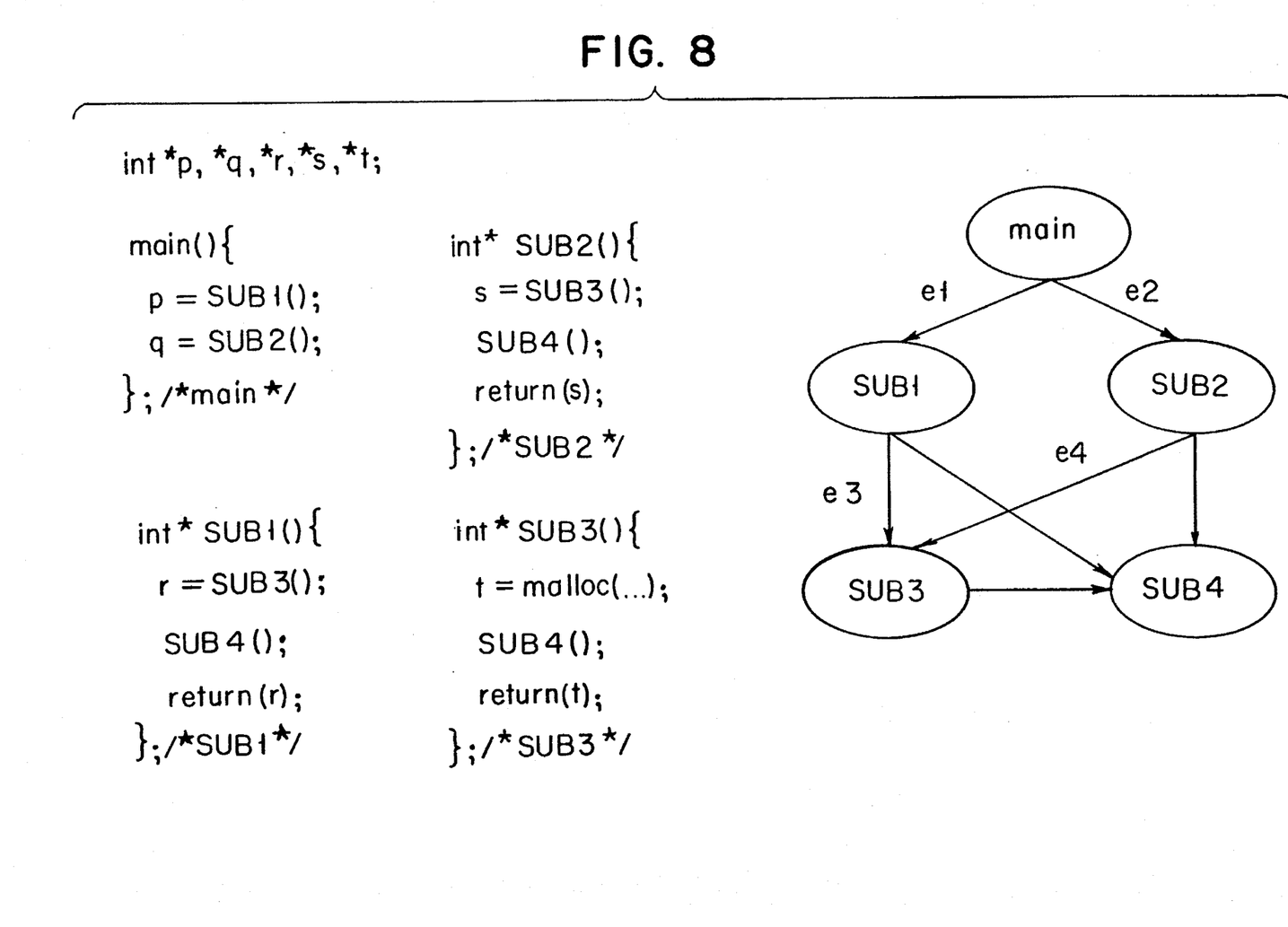
FIG. 8 is an example program segment which contains a statment that dynamically allocates storage and the corresponding PCG for the program.

FIG. 8 shows an example program, where all five pointer variables p,q,r,s,t point to objects dynamically allocated by the malloc statement in procedure SUB3. For the method described in (Chase et al), all the pointer variables are assumed to point to the same location.

One method used to represent alias information in the prior art is to exhaustively enumerate the access path pairs that might refer to the same storage location. (Chow et al, *Proceedings of the/ICM SIGPLAN Symposium on Compiler Construction*, 106–113, (June, 1982), (Landi et al, *Proceedings of the ACM SIGPLAN '92 Conference on Programming Language Design and Implementation*, 235–248 (June, 1992), Landi et al, *Conference Record of the Eighteenth Annual ACM Symposium on Principles of Programming Languages*, 93–103 (January, 1991)). One drawback of an exhaustive representation is that it is large. An exhaustive representation requires more space and more processing. Another disadvantage of an exhaustive representation is that overlapping sub-paths in access paths are represented independently along each path, which results in redundant alias information. An exhaustive representation can also provide imprecise alias information for certain sequences of pointer assignments.

OBJECTS OF THE INVENTION

One objective of the present invention is to enhance the distinction of dynamically allocated objects with different call contexts to improve the precision of interprocedural alias (or other) analysis.

Another objective of the present invention is to provide a compact representation of alias information which improves the efficiency, and in some cases, the precision, of pointer-induced alias analysis.

SUMMARY OF THE INVENTION

The present invention provides a method for qualifying (naming) a dynamically allocated storage location which captures call path information as the name is propagated backward along the program call graph (PCG), distinguishing between different instances of anonymous objects created at the same dynamic storage allocation site but along different paths in the program call graph. The method identifies qualified name pairs as identical when one is a prefix substring of another. This aspect of the invention results in an improved interprocedural alias (or other) analysis of dynamically allocated storage.

The invention also provides a compact method for representing alias information which eliminates alias relations that involve more than one level of dereferencing and which eliminates all alias relations that do not contain at least one dereferenced object.

DETAILED DESCRIPTION OF THE INVENTION

Figure 4:
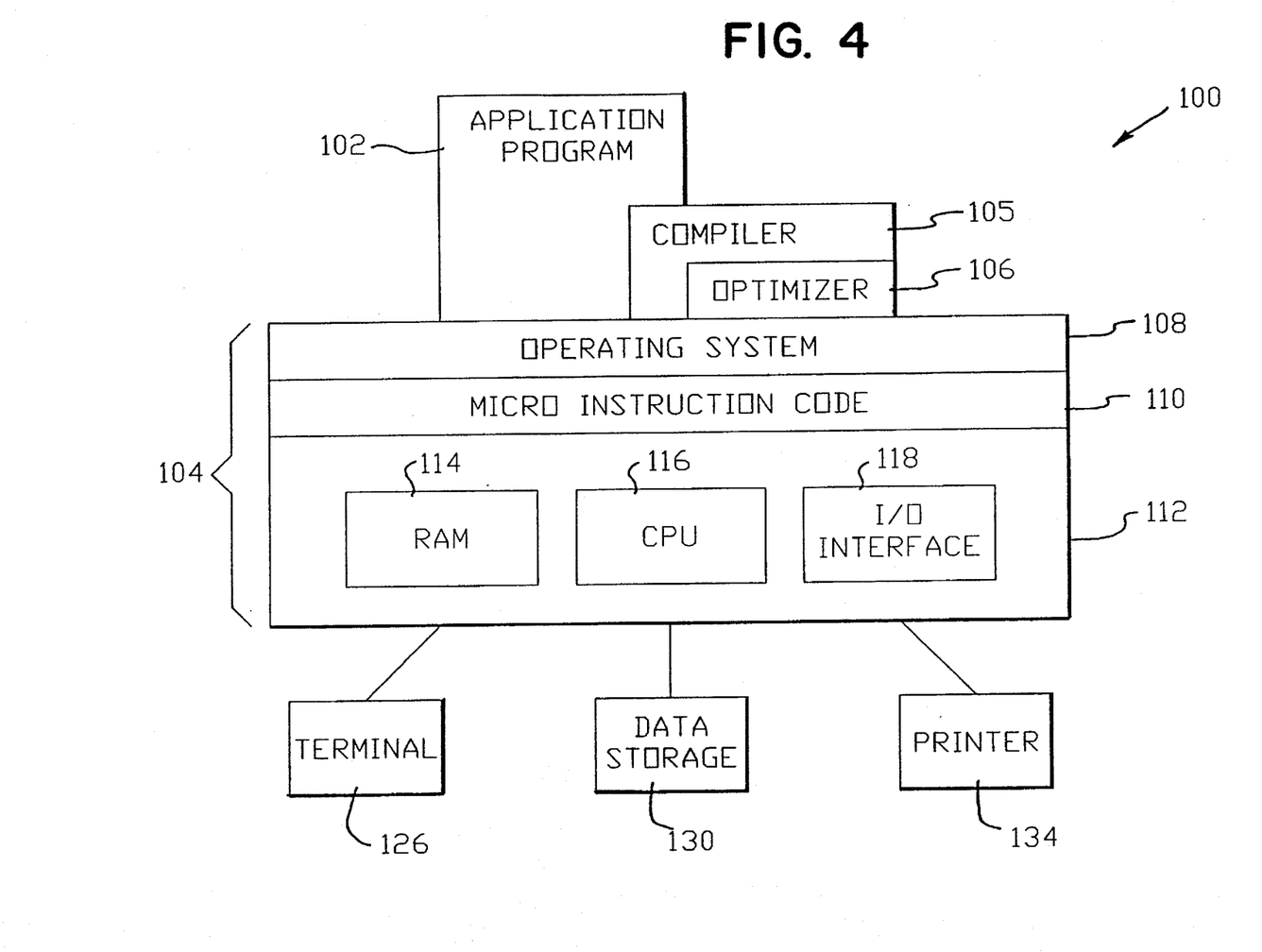
FIG. 4 is a block diagram of a preferred hardware embodiment with a compiler practicing the present invention.

FIG. 4 is a block diagram showing a computer system 100 on which a preferred embodiment of the present invention operates. The preferred embodiment includes one or more application programs 102. One type of application program 102 is a compiler 105 which includes an optimizer 106. The compiler 105 and optimizer 106 are configured to transform a source (like an application program 102) program into optimized executable code. More generally, the source program is transformed to an optimized form and then into executable code. (A more detailed description of basic concepts of compilers is found in Aho et al., *Compilers: Principles, Techniques, and Tools* by Addison-Wesley (1986) which is hereby incorporated by reference in its entirety.)

The compiler 105 and optimizer 106 operate on a computer platform 104 that includes a hardware unit 112. The hardware unit 112 includes one or more central processing units (CPU) 116, a random access memory (RAM) 114, and an input/output interface 118. Micro-instruction code 110, for instance a reduced instruction set, may also be included on the platform 104. Various peripheral components may be connected to the computer platform 104 including a terminal 126, a data storage device 130, and a printing device 134. An operating system 108 coordinates the operation of the various components of the computer system 100. An example of computer system 100 like this is the IBM RISC System/6000 (RISC System/6000 is a trademark of the IBM Corporation.) It is readily understood that those skilled in the computer arts will be familiar with many equivalent computer systems 100.

The invention assumes a method for determining aliases for programs in a language which contains pointers and reference parameters. The particular method used to determine aliases is not relevant to the invention. One preferred embodiment of such a method is disclosed in U.S. Pat. No. 5,485,616 to Burke et al filed on Oct. 12, 1993 entitled *Interprocedural Alias Determination in Computer Compilers* (which is herein incorporated by reference in its entirety).

Figure 5:
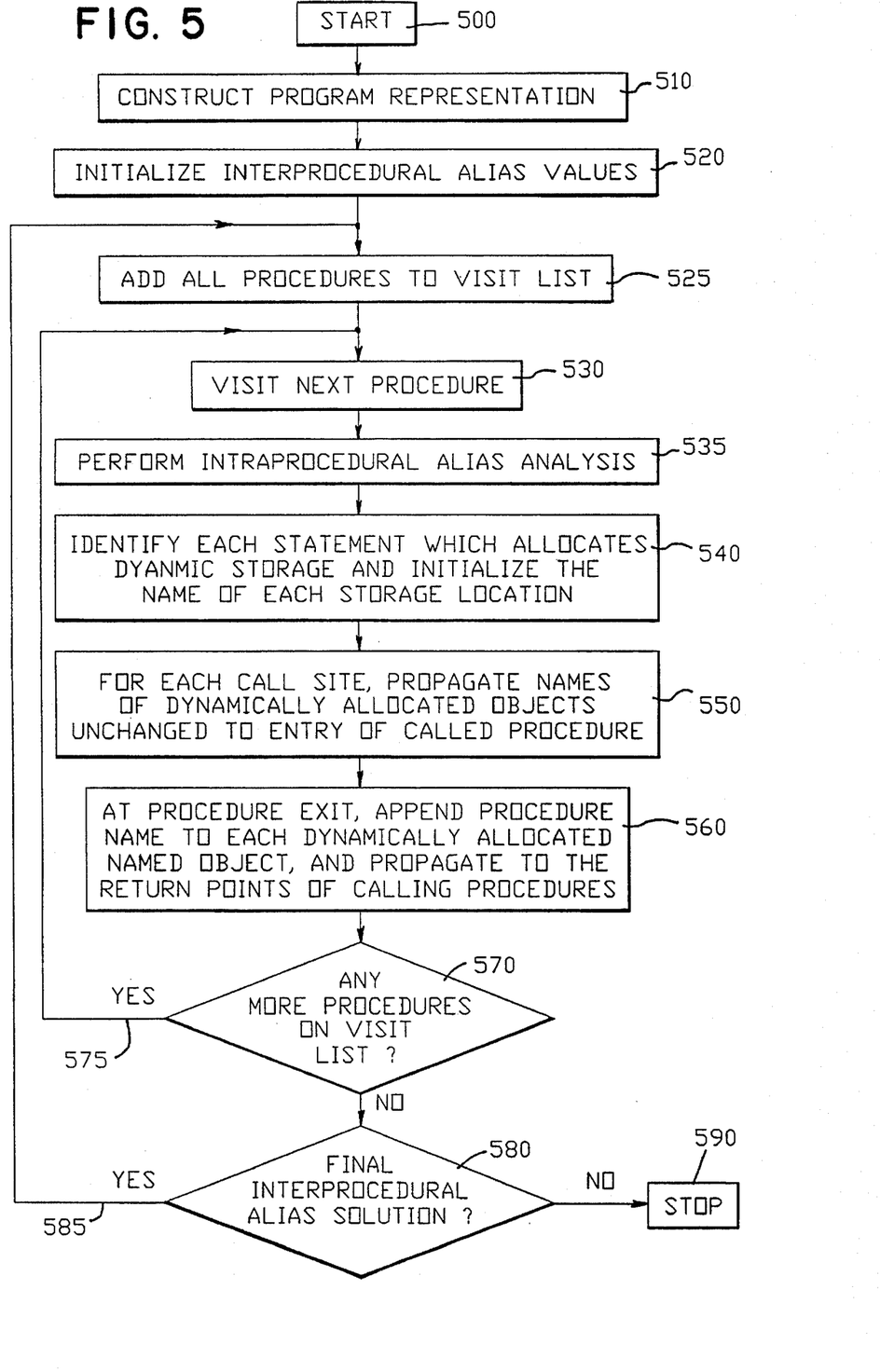
FIG. 5 is a flow chart which shows the steps of the present invention for distinguishing dynamically allocated storage.
Figure 6:
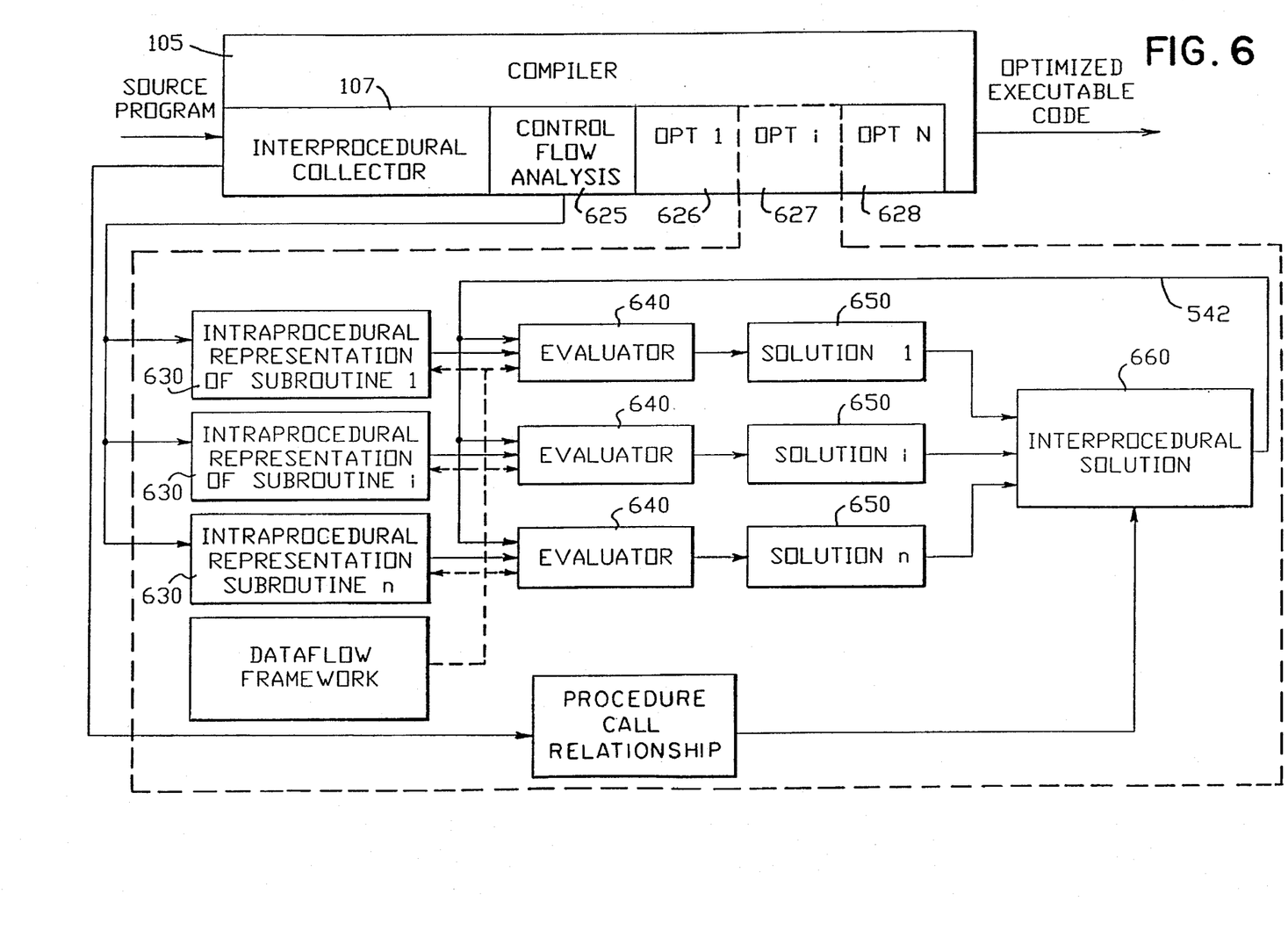
FIG. 6 is a block diagram showing the flow of information for the present invention and relating the information to the phases of a compiler.

FIG. 5 is a flow chart which shows the steps of the present invention for distinguishing dynamically allocated storage. FIG. 6 shows the flow of information between the modules which embody a method for interprocedural data flow analysis (including interprocedural alias analysis) and the modules which embody the context for the method. In a preferred embodiment, the method is executed as part, or a phase 627, of more than one phase (107, 625–628) of the compiler optimizer program 106 (FIG. 4). Other optimizer 106 phases (626 through 628), used to optimize a given application program 102, may precede and follow the execution (running) of the alias (or other) analysis.

FIG. 5 is now described. The method of the invention is based on some representation of the program which indicates the calling relationships of the procedures within the program. One such representation is the Program Call Graph (PCG) which is described earlier and is the preferred embodiment but is not requited. The method 500 in FIG. 5 starts by, using techniques disclosed in the prior art, bulking or constructing 510 a program representation 630 which describes the calling relationships 610. After initialization 520 of the interprocedural alias solution 660 the sequence of steps used to perform interprocedural alias analysis 585 is repeated until a final interprocedural alias solution 660 is computed. The invention assumes a method for performing interprocedural alias analysis, indicated by the loop 585. The particular method used to perform interprocedural alias analysis is not relevant to the invention. One preferred embodiment of such a method is disclosed in U.S. Pat. No. 5,485,616 to Burke et al filed on Oct. 12, 1993 entitled *Interprocedural Alias Determination in Computer Compilers*.

The set of application program 102 procedures is identified during the construction of the program representation. All procedures are placed on the visit list 525. The procedures may be visited in any order. A topological ordering of the procedures is a preferred embodiment for efficiency. Each procedure is visited 530 and intraprocedural alias analysis is performed 535 (640). The particular method used to perform intraprocedural alias analysis is not relevant to the invention. Each procedure is examined to identify each statement that dynamically allocates storage 540. Each storage location that is dynamically allocated is given a unique initial name 540, which is referred to as the root name. The technique for generating a root name is not relevant to the invention; a preferred embodiment uses the statement number as the unique name. The identification and initial naming of each dynamically allocated storage object only needs to be performed the first time that the procedure is visited. This optimization, performing the identification and initial naming the first time only, is a preferred embodiment.

During alias analysis, alias information at call sites is propagated from the call sites to the entry points of the called routines. The names of dynamically allocated objects which appear in the alias information that is propagated to entry points are propagated unchanged 550. Alias information at the procedure's exit point is also propagated to the return points of invoking procedures. The names of dynamically allocated objects which appear in the alias information that is propagated to return points are appended with an additional name string that captures call path information 560. The loop 575 is repeated for each procedure 570 until there are no more procedures on the visit list (all procedures have been visited). A worklist of procedures whose values have changed may be used in place of the visit list for greater efficiency and is a preferred embodiment. If the final interprocedural alias solution 660 has been computed 580, the method terminates 590.

This method substantially improves interprocedural alias information by distinguishing different instances of dynamically allocated objects. While this method has been described in terms of alias analysis, it can be applied to any interprocedural analysis method which would benefit from distinguishing dynamically allocated objects with different call contexts. The method described here improves on the prior art by qualifying each named dynamically allocated object with a name string that captures call path information. With this method, two qualified names are identified as identical if and only if one qualified name is a prefix substring of the other.

For example in FIG. 8, this method is used to improve the interprocedural aliasing information. FIG. 8 shows an example program, where all five pointer variables, p,q,r,s,t point to objects dynamically allocated by the malloc statement in SUB3. The storage location allocated in SUB3 is first given the initial (root) name M1 based on the malloc statement. At the call site of SUB3 in SUB1, the name becomes M1e3, and *r becomes aliased to M1e3; and at the call site of SUB1 in main, the name becomes M1e3e1, and *p becomes aliased to M1e3e1. At the call site of SUB3 in SUB2, the name becomes M1e4, and *s becomes aliased to M1e4; and at the call site of SUB2 in main, the name becomes M1e4e2, and *q becomes aliased to M1e4e2. Note that names are appended with call path information when they are propagated (backward) from the callee to the caller, but not when and after they are propagated (forward) from the caller to the callee. Therefore, named object names, propagated from a caller to a callee, do not change when they are propagated back from the callee to the caller. Also note that alias information propagated from a caller to a callee can be propagated from the callee only to that caller, not to other callers.

In main, the method identifies *r and *p as accessing the same named object since *r is aliased to M1e3e1, which is a prefix substring of (in fact identical to) the named object to which *p is aliased. Note that r is aliased to M1e3e1 in main, while it is aliased to M1e3 in SUB1. The method also identifies *s and *q as aliases in main. However, *p and *q are not aliases since the object name to which *p is aliased is not a prefix substring of the object name to which *q is aliased, and vice versa.

Thus, this method determines that *p is not aliased to *q or *s; and that *q is not aliased to *p or *r, in contrast to the prior art. This method thereby improves the precision of alias information for dynamically allocated named objects.

The method handles call chains with cycles (due to recursive calls) by not allowing a name string to have duplicate call graph edges in it. With this scheme, the number and length of name strings are bounded by the program size, while the capability of distinguishing different instances of the objects created at the same place is compromised.

Figure 7:
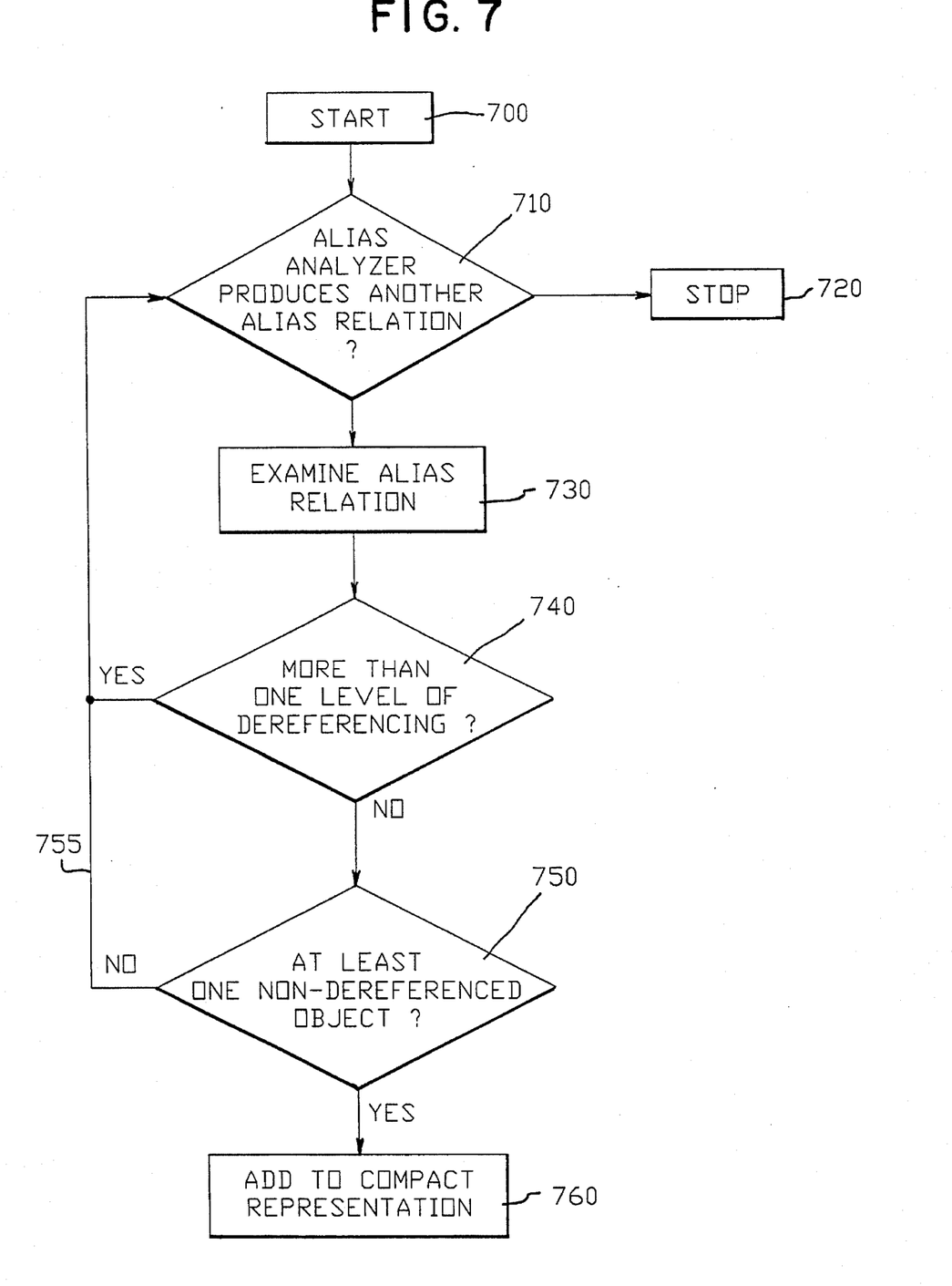
FIG. 7 is a flow chart which shows the steps of the present invention for producing a compact representation for alias information.

FIG. 7 is a flow chart which illustrates the steps of that aspect of the present invention which provides a compact representation for alias information. The invention assumes a method 710 for determining aliases for programs in a language which contains pointers and reference parameters. The particular method used to determine aliases is not relevant to the invention. One preferred embodiment of such a method is disclosed in U.S. Pat. No. 5,485,616 to Burke et al filed an Oct. 12, 1993 entitled *Interprocedural Alias Determination in Computer Compilers.*

The input to the invention is the set of alias relations determined by some method as described above; these are input one at a time. The output is a set which compactly represents the alias solution.

An alias analyzer produces alias relations one at a time 710. When all aliases in the program have already been processed, the method stops 720. In the outer-most loop of the flow chart (with backwards edge 755), the alias relations which are produced for the program are examined one by one 730. If either object of the alias relation has more than one level of dereferencing 740, then it is not included in the compact representation 755. Otherwise, if there is at least one non-dereferenced object in the alias relation 750, it is added to the output set of relations comprising the compact representation 760.

Note that the step of eliminating an alias relation which does not contain at least one non-dereferenced object 750 may be performed before the step of eliminating an alias relation which involves more than one level of dereferencing 740. The order of these two steps is not important.

This method improves the time and space efficiency of alias analysis by keeping only the above compact representation, rather than exhaustive alias information. Full alias information is expanded later as needed when alias information is factored into general data-flow analysis.

We now describe the use of the compact representation in the data flow analysis components of the compiler optimizer 106, 626 through 628. Since the named object is used, rather than the access path through pointers aliased to the named object, the method does not lose any data-flow information by discarding alias pairs that do not contain a named object. However, with such alias pairs discarded, a transitive closure operation is required for correctness when the alias information is used for data-flow analysis.

The transitive closure operation is now described. Consider the directed graph determined by pointer-induced alias relations (defined in background section). For a given access path, the corresponding path(s) in the directed graph is (are) traversed to determine the named object(s) to which it is aliased. During this traversal, the number of de-references encountered must be counted. This is equivalent to performing, on demand, a transitive closure on the directed graph of alias relations. The compact representation corresponds to the transitive reduction of this graph.

Figure 9:
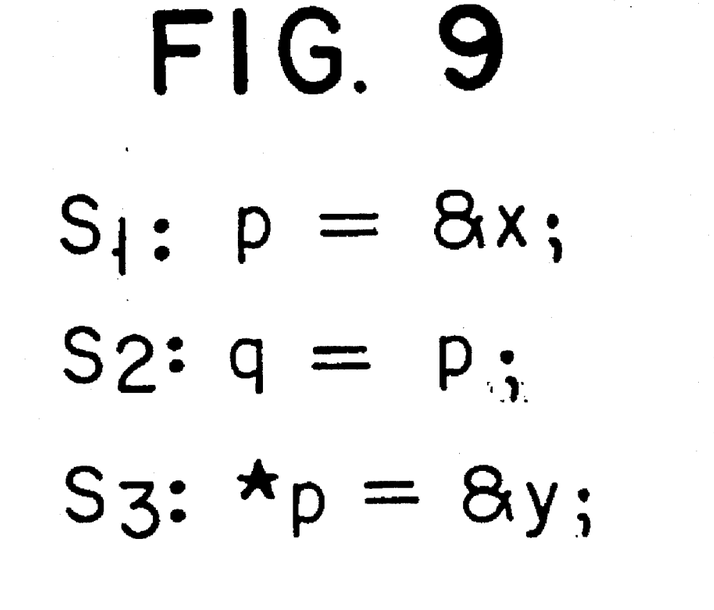
FIG. 9 is an example program segment which contains pointer assignments and is used to illustrate the compact representation of alias information.

An advantage of the transitive reduction/closure representation is demonstrated by the code fragment listed in FIG. 9. In this compact representation the alias relations at S2 are <*q,x> and <*p,x>. The alias relations at S3 are <*q,x>, <*p,x>, and <*x,y>. The application of the transitive closure operation at S3 yields the alias relation <**q,y>. A full representation would require that the additional alias relation <*p,*q> be added at S2 in order to determine that the alias relation <**q,y> exists at S3.

Figure 10:
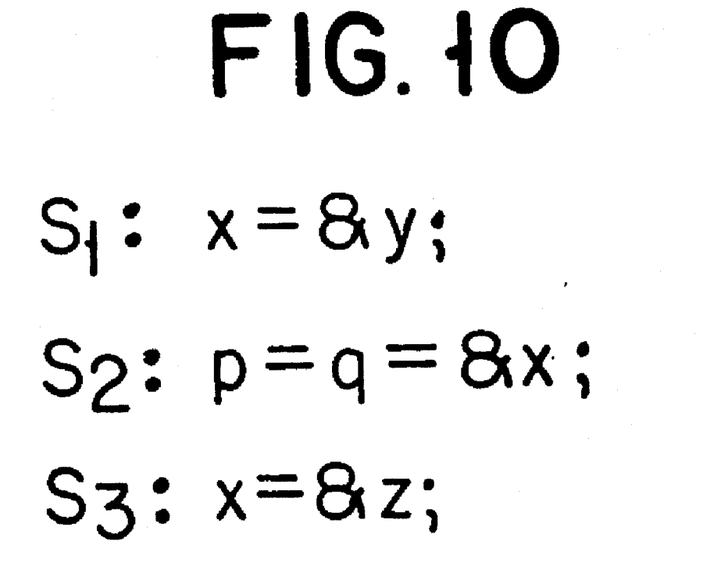
FIG. 10 is an example program segment which contains pointer assignments and is used to illustrate the the improved precision of the compact representation.

Performing the transitive reduction of alias relations can improve the precision of alias information. Consider the program segment of FIG. 10. Assuming no aliases hold before S1, <*x,y> is the only alias after S1. After S2, the exhaustive alias relations holding are as follows:

$$\{<*x,y>,<*p,x>,<*q,x>,<*p,q>,<p,y>,<q,y>,<**p,*x>,<**q*x>,<p,q>\}, \quad (1)$$

all of which can be represented by the following transitive reduction:

$$\{<*p,x>,<*q,x>,<*x,y>\}. \quad (2)$$

After S3, the transitive reduction information becomes:

$$\{<*p,x>,<*q,x>,<*x,z>\}, \quad (3)$$

from which the exhaustive information can be computed:

$$\{<*x,z>,<*p,x>,<*q,x>,<*p,*q>,<p,z>,<q,z>,<**p,*x>,<**q,*x>,<p,q>\}. \quad (4)$$

The difference between (1) and (4) is that every access path y in (1) has been replaced by z in (4).

However, the exhaustive alias information computed by applying S3 directly to (1) is as follows:

$$\{<p,y>,<q,y>\} \cap \quad (5)$$

$$\{<*x,z>,<*p,x>,<*q,x>,<*p,*q>,<p,z>,<q,z>,<**p,*x>,<**q,*x>,<p,q>\}, \quad (6)$$

which contains additional alias relations (5), which are carried over from (1). Note that <**p,*x> and <**q,*x> in (6) are implicit aliases derived from <*p,x> and <*q,x>, respectively. These alias relations are originated from <*x,y> at S1 and {<*p,x>, <*q,x>} at S2. Once generated however, they have lost their sources and are carried over after S3, although S3 invalidates one of their sources: <*x,y>. Therefore, performing the transitive reduction not only improves the efficiency of the analysis, but can improve the precision as well.

Given this disclosure, a person skilled in the computer arts could develop alternative equivalent embodiments which are within the contemplation and scope of the present invention.

We claim:

1. In a computer processor executing a computer compiler, a compile-time method for interprocedurally distinguishing dynamically allocated storage locations within a computer application that is implemented within the computer compiler, comprising the steps of:

a. constructing a Program Call Graph of the computer application, the Program Call Graph having a plurality of Program Call Graph nodes and edges, each Program Call Graph node representing a procedure in the computer application, the procedure having one or more statements, and each Program Call Graph edge connecting two Program Call Graph nodes, a source node being a calling Program Call Graph node and a target node being a called Program Call Graph node and a Program Call Graph edge having a forward direction from the calling Program Call Graph node to the called Program Call Graph node, each of the Program Call Graph edges having an edge name;

b. constructing a representation of each procedure in the computer application, each of the procedures having a representation with an entry node, an exit node, and zero or more call site nodes, zero or more of the procedures being a calling procedure with one or more call site nodes, each call site node of the calling procedure designating a called procedure and each call site node of the calling procedure having a return point, the return point indicating a point of return of a control flow of the called procedure back to the calling procedure;

c. for each procedure in the computer application, initializing an entry alias solution with an entry alias solution value for the entry node and an exit alias solution with an with alias solution value for the exit node, the entry alias solution value and the exit alias solution value capable of having zero or more names, zero or more of the names being dynamically allocated object names, each dynamically allocated object name identifying a dynamically allocated storage location;

d. during an interprocedural alias analysis, performing the following steps:

d1. adding all procedures in the computer application to a visit list;

d2. removing one of the procedures, being a visited procedure, from the visit list;

d3. identifying each statement in the visited procedure which allocates one or more of the dynamically allocated storage locations and associating each dynamically allocated storage location with a root name, the root name being all or part of the dynamically allocated object name of the respective dynamically allocated storage location;

d4. performing an intraprocedural alias analysis on the visited procedure using the entry alias solution value to compute a call site alias solution value at each call site of the visited procedure and a new exit alias solution value;

d5. propagating, in the forward direction, the call site alias solution value from each call site within the visited procedure to the entry node of the called procedure being called by the respective call site of the visited procedure, the call site alias solution value including zero or more of the dynamically allocated object names, the dynamically allocated object names being unchanged during this step;

d6. propagating the new exit alias solution value from the exit node of the visited procedure in a backward direction to the return points of the procedures calling the visited procedure and adding the edge name of the Program Call Graph edge to each dynamically allocated object name being propagated in the backward direction;

d7. repeating steps d2 through d6 while the visit list is not empty; e. repeating steps d1 through d7 until all the entry alias solution values and all the exit alias solution values do not change;

f. identifying a first and a second dynamically allocated object name as identical if the first dynamically allocated object name is a substring of the second dynamically allocated object name and distinguishing a first and a second dynamically allocated storage location if the first and the second dynamically allocated object names of the respective dynamically allocated storage locations are not identical.

2. In a computer processor executing a computer compiler, a method implemented within the computer compiler for compactly representing a set of alias relations within a computer application, comprising the steps of:

a. identifying and eliminating all alias relations which involve more than one level dereferencing; and
   b. identifying and eliminating all alias relations that do not contain at least one named object, a named object being a memory location associated with a name that is not a pointer access path, the remaining relations of the set of alias relations being the compact representation.

3. A computer system having a platform with random access memory, a central processing unit, an input/output interface, and an operating system, also having one or more input/output means, a compiler, and one or more application programs, a computer processor executing the compiler, the compiler performing a compile time method for interprocedurally distinguishing dynamically allocated storage locations, the method comprising the steps of:

a. constructing a Program Call Graph of the computer application, the Program Call Graph having a plurality of Program Call Graph nodes and edges, each Program Call Graph node representing a procedure in the computer application, the procedure having one or more statements, and each Program Call Graph edge connecting two Program Call Graph nodes, a source node being a calling Program Call Graph node and a target node being a called Program Call Graph node and a Program Call Graph edge having a forward direction from the calling Program Call Graph node to the called Program Call Graph node each of the Program Call Graph edges having an edge name;
   b. constructing a representation of each procedure in the computer application, each of the procedures having representation with an entry node, an exit node, and zero or more call site nodes, zero or more of the procedures being a calling procedure with one or more call site nodes, each call cite node of the calling procedure designating a called procedure and each call site node of the calling procedure having a return point, the return point indicating a point of return of a control flow of the called procedure back to the calling procedure;
   c. for each procedure in the computer application, initializing an entry alias solution with an entry alias solution value for the entry node and an exit alias solution with an exit alias solution value for the exit node, the entry alias solution value and the exit alias solution value capable of having zero or more names, zero or more of the names being dynamically allocated object names, each dynamically allocated object name identifying a dynamically allocated storage location;
   d. during an interprocedural alias analysis, performing the following steps:
      d1. adding all procedures in the computer application to a visit list;
      d2. removing one of the procedures, being a visited procedure, from the visit list;
      d3. identifying each statement in the visited procedure which allocates one or more of the dynamically allocated storage locations and associating each dynamically allocated storage location with a root name, the root name being all or part of the dynamically allocated object name of the respective dynamically allocated storage location;
      d4. performing an intraprocedural alias analysis on the visited procedure using the entry alias solution value to compute a call site alias solution value at each call site of the visited procedure and a new exit alias solution value;
      d5. propagating, in the forward direction, the call site alias solution value from each call site within the visited procedure to the entry node of the called procedure being called by the respective call site of the visited procedure, the call site alias solution value including zero or more of the dynamically allocated object names, the dynamically allocated object names being unchanged during this step;
      d6. propagating the new exit alias solution value from the exit node of the visited procedure in a backward direction to the return points of the procedures calling the visited procedure and adding the edge Program Call Graph edge to each dynamically allocated object name being propagated in the backward direction;
      d7. repeating steps d2 through d6 while the visit list is not empty;
   e. repeating steps d1 through d7 until all the entry alias solution values and all the exit alias solution values do not change;
   f. identifying a first and a second dynamically allocated object name as identical if the first dynamically allocated object name is a substring of the second dynamically allocated object name and distinguishing a first and a second dynamically allocated storage location if the first and the second dynamically allocated object names of the respective dynamically allocated storage locations are not identical.

4. A computer system having a platform with random access memory, a central processing unit, an input/output interface, and an operating system, also having one or more input/output means, a compiler, and one or more application programs, a computer processor executing the computer compiler, the compiler performing a compile time method for compactly representing a set of alias relations within a computer application, the method comprising the steps of:

a. identifying and eliminating all alias relations which involve more than one level of dereferencing; and
   b. identifying and eliminating all alias relations that do not contain at least one named object, a named object being a memory location associated with a name that is not a pointer access path, the remaining relations of the set of alias relations being the compact representation.

* * * * *